UNITED STATES PATENT OFFICE.

FRANK V. O'NEILL, OF BOSTON, MASSACHUSETTS, ASSIGNOR, BY DIRECT AND MESNE ASSIGNMENTS, OF ONE-HALF TO HENRY CARMICHAEL, OF MALDEN, MASSACHUSETTS, AND ONE-HALF TO WANDA W. MacKUSICK, OF BOSTON, MASSACHUSETTS.

PROCESS OF TREATING VULCANIZED RUBBER.

1,243,623.  Specification of Letters Patent.  Patented Oct. 16, 1917.

No Drawing.   Application filed October 28, 1913. Serial No. 797,770.

*To all whom it may concern:*

Be it known that I, FRANK V. O'NEILL, a citizen of the United States, residing in Boston, county of Suffolk, and State of Massachusetts, have invented an Improvement in Processes of Treating Vulcanized Rubber, of which the following description is a specification.

This invention relates to a process for the recovery of rubber from rubber waste.

It is well known that ordinary vulcanized rubber contains sulfur in two distinct states; that free or uncombined and that chemically combined with the rubber substance. Upon the combined sulfur depend all the properties which distinguish vulcanized from raw or native india rubber, such as pliability, extensibility, resiliency, resistance to changes of temperature and insolubility in the well known solvents of raw rubber. If brought in a finely divided condition in contact with solvents of sulfur, the free sulfur may be removed, but the combined sulfur remains and the vulcanized substance is substantially unchanged.

Processes for dissolving out by chemical means, both the free sulfur and the vegetable fiber of rubber waste, are of record, but the products, although called "devulcanized," retain the combined sulfur and are a poor substitute for raw rubber.

I am aware that numerous processes have been recorded by which it has been claimed vulcanized rubber can be "devulcanized," but which, in fact, merely remove the free sulfur and soften the rubber, or if capable of bringing the vulcanized rubber into true solution, greatly impair the qualities of the rubber, which condition greatly impairs its value.

When the rubber is reclaimed by treatment with turpentine, pyridin, anilin, etc., the high temperature required for solution of the rubber or for the removal of the solvent therefrom, distinctly injures the product and appears to have, by chemical disintegration, permanently injured the rubber.

When treated by my process, the rubber which remains after removal of solvent, exhibits all the characteristics of raw rubber, such as the following:—

(1) It dissolves in the usual solvents of raw rubber.

(2) It does not vulcanize without addition of sulfur.

(3) Mixed with sulfur it vulcanizes the same as raw rubber.

(4) Vulcanized, it has the strength, flexibility, resiliency, etc., of soft vulcanized rubber.

The solvent I have found best suited to the practice of my invention is refined rosin spirit; that is, rosin spirit or rosin naphtha of commerce, which is especially refined for my purpose, so as to exclude the high-boiling constituents, as will be described.

Commercial rosin spirit is preferably neutralized with an alkali and distilled by direct heat or preferably by jets of steam. The distillation is continued until the temperature of the vapor rises to about 130° centigrade and the fractions below this temperature are run off from the receiver for use. The fractions which are distilled off at or below about 130° C. constitute refined rosin spirit, and will be hereinafter referred to as the solvent.

So efficient is this solvent, I find it unnecessary to grind the rubber waste into small particles, as has been done by others in reclaiming waste.

In using this solvent, the waste rubber is exposed to the liquid at a temperature of about 130° C. or a temperature high enough to rapidly dissolve the vulcanized rubber and not high enough to be detrimental to the final product of the process. As this maximum temperature will vary somewhat according to the original quality of the rubber vulcanized, it may be readily ascertained by treating two lots of any given sample of vulcanized rubber of known composition; one at a temperature above and one below 130° C. If the rubber recovered at the higher heat is more sticky and less elastic than the other lot, and when vulcanized is weaker and less flexible and resilient, then the maximum temperature has been exceeded and the true maximum is found by continued comparison. For the best results, a detrimental temperature should not be reached at any stage of the process.

During the solution of the rubber waste, the solvent exerts considerable tension or pressure, and this stage of the process should be conducted in a strong, closely-covered digester.

The following example may serve as an illustration of the working of my process:—

Automobile tires or shoes and similar rubber waste articles, in their original undivided condition, of use, are immersed in the solvent, refined rosin spirit, in a closed digester. The digester is provided with thermometer, pressure gage, steam jacket, drainer bottom, and suitable valve connections. By means of steam in the jacket, the temperature is raised, preferably to about 130° C. and maintained for about two hours. A lower temperature may be used, but the time required to effect complete solution of the rubber will be prolonged. The quantity of the solvent used is about two and one-half times that of the rubber waste, and the working pressure in the digester is about 60 pounds. The cock below the perforated drainer bottom is now opened, and the rubber solution is blown through the connecting pipe to a vessel, which serves as a still body. Much of the solvent passes off as a vapor through the neck at the top to the condenser connected therewith, and is saved in a receiver. Thereafter, or following the blow-off referred to, steam in jets is forced through the thick rubber solution in the still body until no more solvent passes over, and is condensed with accompanying solvent in the condenser. From the receiver the water is tapped off and the solvent is now ready for re-use.

The rubber in the still body is now removed with more or less water of condensation, and after being mechanically separated from the latter, is placed in a steam-heated vacuum chamber and freed from any remaining water or solvent.

The product thus recovered has the characteristics of the original rubber compound before vulcanization, and may be mixed with sulfur and vulcanized in the same manner.

The textile material of the rubber waste, which remains in the digester, may be washed in or out thereof with any well-known solvent of raw rubber and forms a valuable by-product.

As a measure of economy in some instances, but without technical advantage, well-known solvents of raw rubber, such as toluol, benzin, coal-tar or petroleum naphtha and the like, may be used as diluents of the solvent.

The apparatus used in practising the above-mentioned process may be of well-known or ordinary construction, such as commonly found in laboratories, and it has been deemed unnecessary to illustrate the same for a full understanding of the process.

Claims:

1. The process of reclaiming and regenerating rubber from rubber waste, which consists in treating rubber waste in a closed digester under pressure and at a temperature below that detrimental to the rubber product, with refined rosin spirit having a boiling point below a temperature detrimental to the rubber, maintaining digestion until the vulcanized rubber is dissolved, evaporating the solvent in the presence of steam below detrimental temperature, and finally removing from the regenerated rubber moisture and solvent, substantially as described.

2. The process of reclaiming and regenerating rubber from rubber waste consisting in treating rubber waste in a closed receptacle under pressure at a temperature below that detrimental to the rubber product, in the presence of refined rosin spirit having a boiling point below detrimental temperature, and removing the volatile solvent from the dissolved and devulcanized rubber by evaporation below detrimental temperature.

3. The process of reclaiming and regenerating rubber from rubber waste consisting in digesting rubber waste, at a temperature not injurious to the final product and until the vulcanized rubber is dissolved, with the liquid constituents of rosin spirit having a boiling point at or below 130° C., normal pressure, and obtained therefrom by fractional distillation, and finally separating the rubber solvent with the sulfur therein from the regenerated rubber.

4. The process of reclaiming and regenerating rubber from rubber waste consisting in the treating of rubber waste with refined rosin spirit at a temperature below that injurious to the regenerated rubber and subjecting the rubber solution thus formed to heat below detrimental temperature to drive off the solvent.

5. The process of reclaiming and regenerating rubber from rubber waste, which consists in treating rubber waste with the substances which form the more volatile constituents of commercial rosin spirit, subjecting the rubber solution thus formed to heat below detrimental temperature to drive off the solvent, mechanically separating water from the rubber, and heating the rubber under a vacuum.

6. The process of reclaiming and regenerating rubber from rubber waste, which consists in treating rubber waste with refined rosin spirit heated to a temperature below a point detrimental to the rubber.

7. The process of treating vulcanized rubber, which consists in subjecting the vulcanized rubber to the action of refined rosin spirit to separate the rubber and leave the latter unimpaired and with the characteristics of natural unvulcanized raw rubber.

8. The process of reclaiming and regenerating rubber from rubber waste, which consists in treating rubber waste in a closed digester under pressure and at a temperature below that detrimental to the rubber product, with refined rosin spirit having a boiling point below a temperature detrimental to the rubber.

9. The process of reclaiming and regenerating rubber from rubber waste which consists in digesting the rubber waste at a temperature not injurious to the final product and until the vulcanized rubber is dissolved, with refined rosin spirit, mechanically separating the rubber solution from the impurities of the rubber waste, heating the rubber solution in a still body by means of steam forced through the rubber solution therein, removing the rubber from the still body, and mechanically separating the water therefrom, and finally heating the rubber thus treated in a vacuum chamber.

In testimony whereof, I have signed my name to this specification in the presence of two subscribing witnesses.

FRANK V. O'NEILL

Witnesses:
JAS. H. CHURCHILL,
J. MURPHY.